United States Patent
Kim et al.

(10) Patent No.: US 7,760,418 B2
(45) Date of Patent: Jul. 20, 2010

(54) ELECTROPHORETIC DISPLAY DEVICE WITH IMPROVED REFLECTIVE LUMINANCE

(75) Inventors: Jun-hyung Kim, Yongin-si (KR); Nam-seok Roh, Seongnam-si (KR); Dae-jin Park, Incheon (KR); Jeong-ye Choi, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 12/331,205

(22) Filed: Dec. 9, 2008

(65) Prior Publication Data

US 2009/0091816 A1 Apr. 9, 2009

(51) Int. Cl.
*G02B 26/00* (2006.01)
*G09G 3/34* (2006.01)

(52) U.S. Cl. .................................. 359/296; 345/107
(58) Field of Classification Search .......... 359/296; 345/107; 430/32; 204/600
See application file for complete search history.

(56) References Cited

U.S. PATENT DOCUMENTS

2004/0263948 A1  12/2004  Lee
2005/0140906 A1  6/2005   Baek
2005/0200788 A1  9/2005   Edwards
2007/0057963 A1  3/2007   Elliott et al.
2008/0055234 A1* 3/2008   Chopra et al. ............... 345/107

FOREIGN PATENT DOCUMENTS

| JP | 2000-322007 A | 11/2000 |
| JP | 2001-154636 A | 6/2001 |
| JP | 2002-174828 A | 6/2002 |
| JP | 2005-037851 A | 2/2005 |

\* cited by examiner

*Primary Examiner*—William C Choi
(74) *Attorney, Agent, or Firm*—Innovation Counsel LLP

(57) ABSTRACT

An electrophoretic display device with an improved reflective luminance is presented. The electrophoretic display device includes an electrophoretic display panel including sub-pixels corresponding to four colors (e.g., red, green, blue, and white). A signal converter is provided for receiving an image signal for three colors and converting it into an image signal for four colors. A data driver is provided for supplying the converted image signal for four colors to the sub-pixels as a data voltage.

18 Claims, 10 Drawing Sheets under 35 U.S.C. §119, and the
ELECTROPHORETIC DISPLAY DEVICE WITH IMPROVED REFLECTIVE LUMINANCE

CROSS REFERENCE TO RELATED APPLICATIONS

This application claims priority to U.S. patent application Ser. No. 11/486,590 filed Jul. 14, 2006 and Korean Patent Application No. 2005-0063928 filed on Jul. 14, 2005 and all the benefits accruing therefrom under 35 U.S.C. §119, and the contents of the applications in their entirety are herein incorporated by reference.

BACKGROUND OF THE INVENTION

1. Field of the Invention

The present invention relates generally to an electrophoretic display device and more particularly to an electrophoretic display device in which sub-pixels exhibiting four different colors are used to improve reflective luminance.

2. Description of the Related Art

An electrophoretic display (EPD) device is a type of flat display device that is commonly used in electronic books. The EPD device includes two substrates with electric field formation electrodes formed therein and charged particles disposed between the two substrates. A voltage is applied to the two electrodes so that the charged particles move between the electrodes having opposite polarities, thereby displaying an image.

An EPD device has a high reflectivity and contrast. In addition, unlike liquid crystal display devices, the image quality on EPD devices do not vary according to the viewing angle, thus providing advantageously displaying images as on a sheet of paper. EPD devices have bistable characteristics, and thus, the image can remain in displayed state without continuous application of voltage. This bistable characteristic allows EPD devices to operate at reduced power consumption. Another difference between EPDs and liquid crystal devices is that EPD devices do not necessitate a polarization plate, an alignment film, liquid crystal, or other components, and are thus generally less expensive than liquid crystal display devices.

However, liquid crystal display devices have the advantage of being able to display color. A conventional EPD device can only display a black-and-white image, and a separate color filter is needed to display a color image. In addition, the EPD device is not a light-emitting device in itself, so it uses external light. Due to the reliance on external light, EPD devices sometime experience the problem of low reflective luminance.

SUMMARY OF THE INVENTION

Accordingly, the invention provides an electrophoretic display device having an improved reflective luminance. The invention also provide a method of driving such an electrophoretic display device.

In one aspect, the invention is an electrophoretic display device including an electrophoretic display panel having sub-pixels corresponding to red, green, blue, and white colors; a signal converter for receiving an image signal for three colors and converting the image signal into an image signal for four colors; and a data driver for supplying the converted image signal for four colors to the sub-pixels as a data voltage.

In another aspect, the present invention is an electrophoretic display device including an electrophoretic display panel including sub-pixels having four colors; a signal converter for receiving an image signal for three colors and converting the image signal into an image signal for four colors; and a data driver for supplying the converted image signal for four colors to the sub-pixels as a data voltage.

In yet another aspect, the present invention is a method of driving an electrophoretic display device that includes an electrophoretic display panel having sub-pixels of four colors. The method entails converting an image signal for three colors into an image signal for four colors; and supplying the converted image signal of four colors to the sub-pixels as a data voltage.

DETAILED DESCRIPTION OF THE INVENTION

Figure 1:
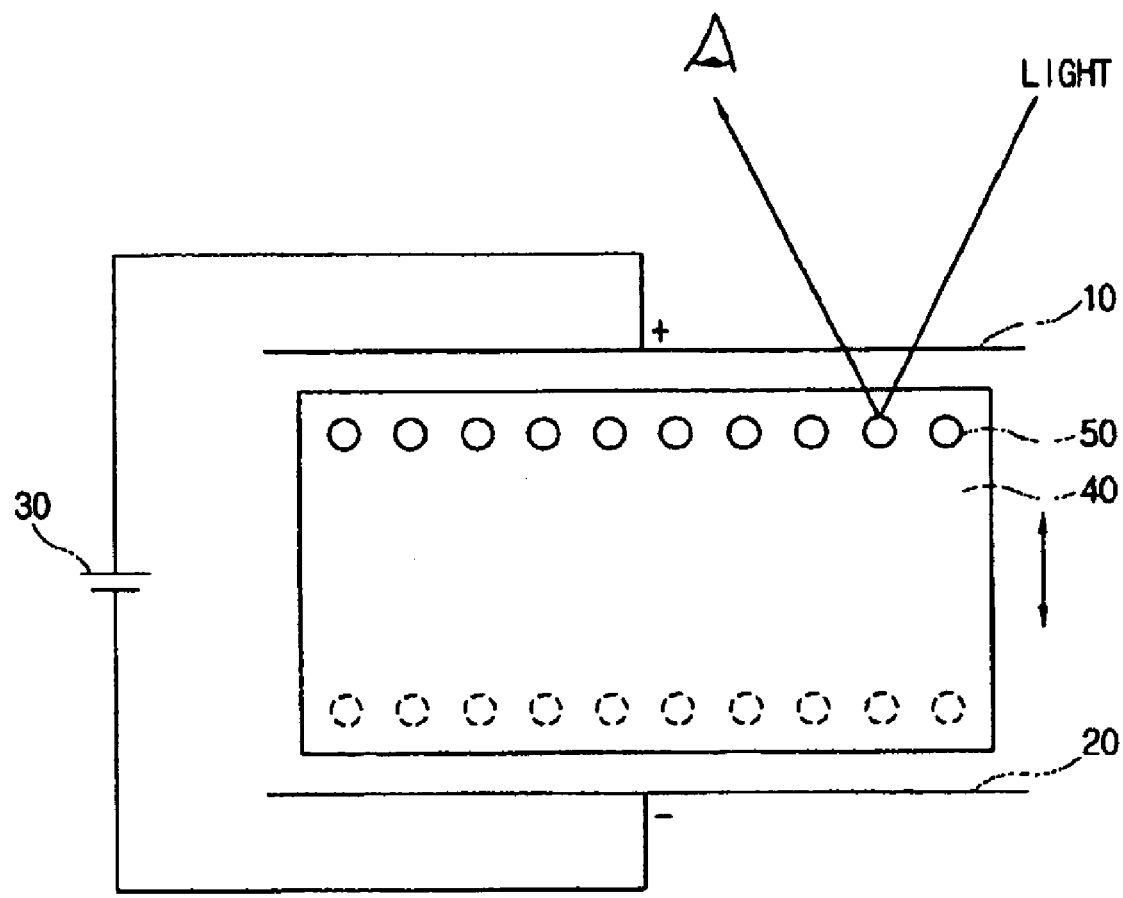
FIG. 1 is a schematic view showing a driving principle of an electrophoretic display device according to an embodiment of the invention.

Hereinafter, preferred embodiments will be described in detail with reference to the accompanying drawings. In the embodiments, like elements are denoted by like reference numerals. Elements that are referred to in the descriptions for different embodiments will be explained only in the first embodiment to minimize redundancy. In the drawings, the thickness and size of layers, films, and regions are exaggerated for clarity. It should be noted that, when an element such as a layer, film, region, or substrate is referred to as being "on" another element, it can be directly positioned on another element or intervening elements may be present.

FIG. 1 is a schematic view showing the driving principle of an electrophoretic display device according to an embodiment of the invention.

As shown in FIG. 1, the electrophoretic display (EPD) device according to an embodiment of the invention includes a pair of electrodes 10 and 20 for forming an electric field. One of the electrodes 10 and 20 serves as a pixel electrode and the other serves as a common electrode. A potential difference forms between the pair of electrodes 10 and 20 according to a voltage applied by a power supply 30. A fluid 40 is disposed between the substrates, and charged particles 50 are dispersed in the fluid 40. The charged particle 50 exhibits a positive polarity or a negative polarity and is red, blue, green, or white.

In the above EPD device according to an embodiment of the invention, when a voltage is applied to the electrodes 10 and 20 to form a potential difference (+,−) between the electrodes 10 and 20, the charged particles move toward the electrode having the opposite charge. A viewer (indicated by the profile of an eye in FIG. 1) sees light that enters the device from the outside and reflects off the charged particle 50. If the charged particle moves close to the viewer, the color of the charged particle 50 appears more vivid to the viewer. If the charged particle 50 moves away from the viewer, the color of the charged particle 50 looks fainter to the viewer.

The charged particles 50 move by electrophoresis. Electrophoresis is a phenomenon where particles having a surface charge move within an electric field towards an electrode exhibiting a charge opposite of the charge of the particle. Electrophoresis is a phenomenon that is understood from the perspective of colloidal science and fluid mechanics rather than as a type of electromagnetic phenomenon.

Figure 2:
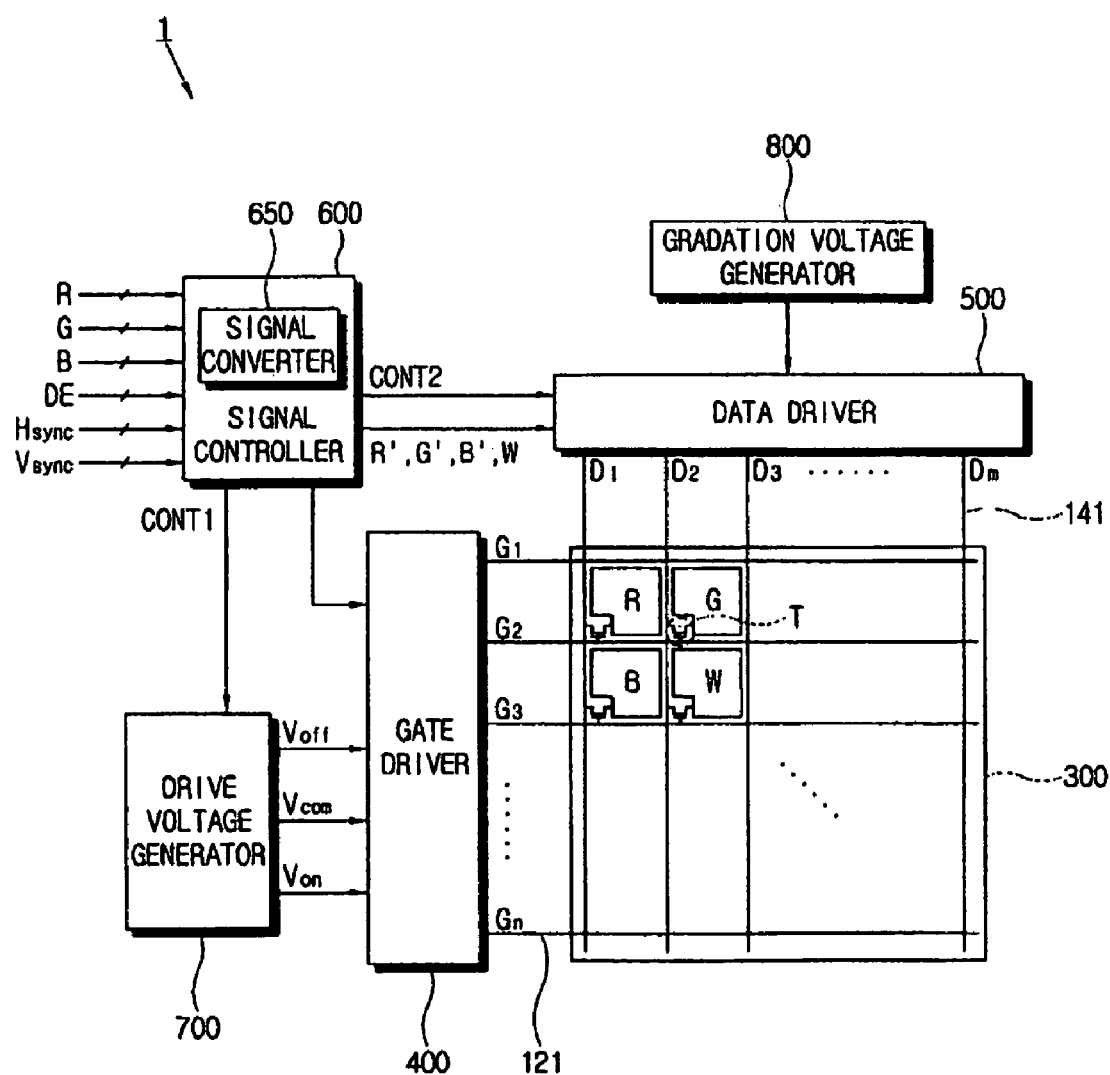
FIG. 2 is a block diagram showing an electrophoretic display device according to a first embodiment of the invention.

FIG. 2 is a block diagram showing an EPD device 1 according to a first embodiment of the invention.

The EPD device 1 of the invention includes an electrophoretic display (EPD) panel 300, a gate driver 400 and a data driver 500 connected to the EPD panel, a drive voltage generator 700 connected to the gate driver 400, a gradation voltage generator 800 connected to the data driver 500, and a signal controller 600 for controlling the above elements.

Figure 3:
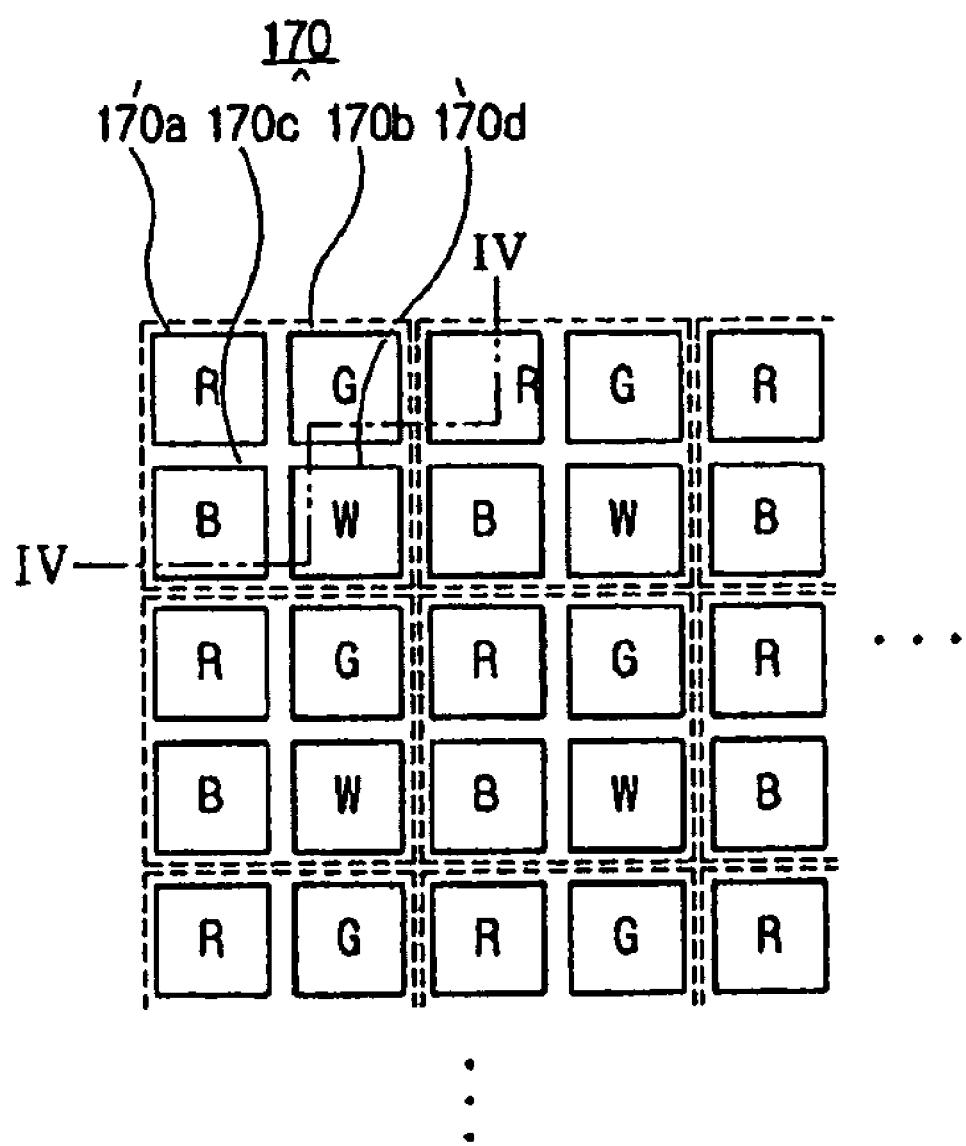
FIG. 3 illustrates a pixel arrangement in the electrophoretic display device according to the first embodiment of the invention.
Figure 4:
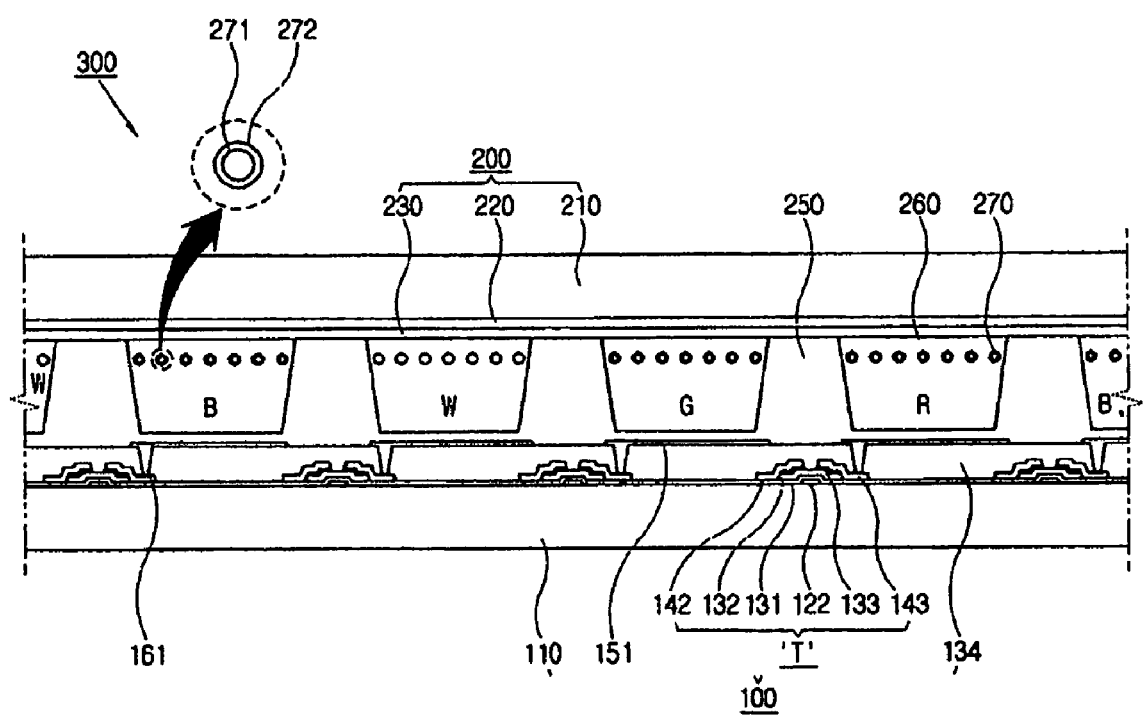
FIG. 4 is a sectional view taken along the line IV-IV in FIG. 3.
Figure 5:
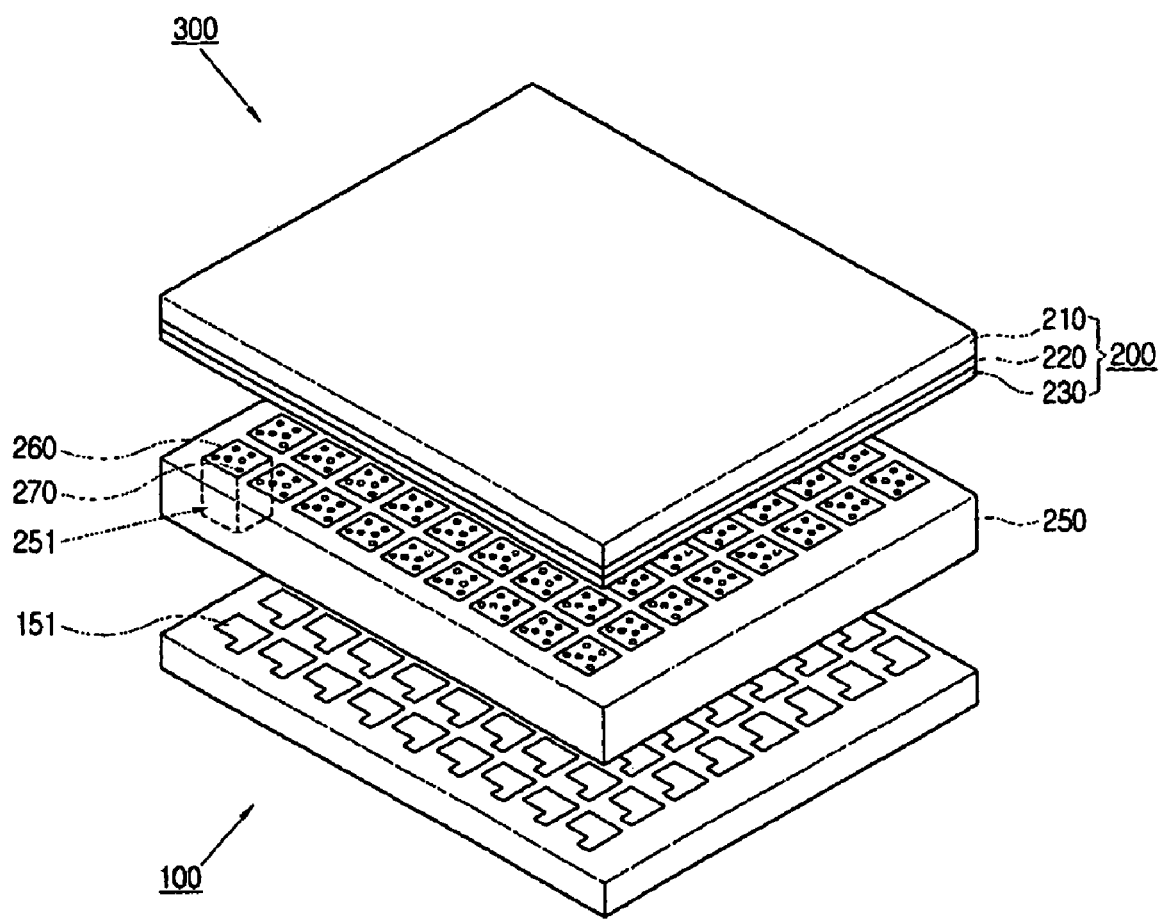
FIG. 5 is an exploded perspective view of the electrophoretic display device according to the first embodiment of the invention.

Referring to FIGS. 3 to 5, the EPD panel will be described hereafter.

FIG. 3 illustrates a pixel arrangement in the electrophoretic display device according to the first embodiment of the invention. FIG. 4 is a sectional view taken along the line IV-IV in FIG. 3. FIG. 5 is an exploded perspective view of the electrophoretic display device according to the first embodiment of the invention.

The EPD panel 300 includes a first substrate 100 and a second substrate 200 and a partition wall 250 disposed between the substrates 100 and 200. Disposed between the partition wall 250 and the second substrate 200 is a fluid layer 260 and charged particles 270 dispersed in the fluid layer 260.

First, the first substrate 100 includes a first insulation substrate 110 and gate wirings (a gate line 121 shown in FIG. 2 and a gate electrode 122) formed thereon. The gate wirings may be made of a single-layered film containing silver, a silver alloy, aluminum, or an aluminum alloy all having low resistivity. Alternatively, the gate wirings may be formed of a multi-layered film whereby one of the layers contains one of the above materials mentioned for the single-layered film. The other layer(s) in the multi-layered film may be formed of chromium, titanium, tantalum, or the like that demonstrate good physical and electrical properties and contact characteristics. The gate wirings include a gate line 121 that extends in the first direction and a gate electrode 122 that is part of a thin film transistor (TFT) T connected to the gate line 121.

A gate insulation film 131 containing silicon nitride (SiNx) is formed on the first insulation substrate 110 and covers the gate lines 121 and the gate electrode 122.

A semiconductor layer 132 is formed on the portion of the gate insulation film 131 that is around the gate electrode 122. The semiconductor layer 132 is made of a semiconductor such as amorphous silicon. An ohmic contact layer 133, which is made of silicide, n+ hydrogenized amorphous silicon doped with a high density of n-type impurity, or the like, is formed on the semiconductor layer 132. The ohmic contact layer 133 is divided into two parts with respect to the gate electrode 122.

Data wirings 141, 142 and 143 are formed on the resistance contact layer 133 and the gate insulation film 131. The data wirings, which include a data line 141, a source electrode 142, and a drain electrode 143, may be formed of silver, aluminum, or other material having low resistivity. Similarly to the gate wirings (gate line 121 and gate electrode 122), the data wiring may include a conductive material having a good contact characteristic with other materials. The data line 141 extends in second direction that is substantially perpendicular to the direction in which the gate line 121 extends. The data lines 141 and the gate lines 121 form a grid, with each subdivision being a pixel. The source electrode 142 branches from the data line 141 and extends to the top of the ohmic contact layer 133. The drain electrode 143 is separated from the source electrode 142 and formed on the ohmic contact layer 133 across the gate electrode 122 from the source electrode 142.

A protective film 134 is formed on the data wirings (i.e., 141, 142 and 143) and on the portion of the semiconductor layer 132 that is not covered by these data wirings. The protective film 134 may contain silicon nitride, a-Si:C:O film or a-Si:O:F film vapor-deposited through a PECVD method, or an acrylic organic insulation film, among other suitable substances. The protective film 134 is provided with a contact hole 161 formed above the drain electrode 143.

A pixel electrode 151 is formed on the protective film 134. The pixel electrode 151 is formed typically of a transparent conductive material such as ITO (indium tin oxide) or IZO (indium zinc oxide).

Each pixel electrode 151 connected to the thin film transistor T forms sub-pixels 170a, 170b, 170c and 170d. Each of the sub-pixels 170a, 170b, 170c and 170d exhibits red R, green G, blue B or white W. The colors of the sub-pixels 170a, 170b, 170c and 170d are determined by the color of a charged particle 270 placed in the respective sub-pixels.

Referring to FIG. 3, the arrangement of the sub-pixels 170a, 170b, 170c and 170d will be explained below. Four sub-pixels 170a, 170b, 170c and 170d constitute one pixel 170. In the first embodiment, the four sub-pixels 170a, 170b, 170c and 170d forming the pixel 170 are arranged in a 2×2 matrix such that a red sub-pixel 170a, a green sub-pixel 170b, a white sub-pixel 170c and a blue sub-pixel 170d are sequentially arranged going clockwise. Each sub-pixel has a substantially rectangular shape and all the sub-pixels have approximately the same size and shape. Thus, the pixel also a rectangular shape. In the EPD device 1 of the invention, the white sub-pixel 170d is provided in addition to the red, blue, green sub-pixels 170a, 170b and 170c. This incorporation of the white sub-pixel 170d helps express a color. More specifically, incorporation of the white sub-pixel 170d improves the reflectivity by around 30%, thus helping achieve a clear and distinct image.

The second substrate 200 is composed of a second insulation substrate 210. A common electrode 220 and a sealing/bonding layer 230 are formed on the second insulation substrate 210.

Typically, the common electrode 220 is formed of a transparent conductive material such as ITO (indium tin oxide) or IZO (indium zinc oxide). The common electrode 220 is formed over substantially the entire surface of the second insulation substrate 210, and, together with the pixel electrode, generates an electric field for driving the positively or negatively charged particle.

The sealing/bonding layer 230 is adhered to the partition wall 250 and prevents the charged particles 270 from moving between neighboring pixels. The sealing/bonding layer 230 may be formed of polymer materials. In other embodiments, the sealing/bonding layer 230 may be separately prepared from the second substrate 200 and attached to the second substrate 200 during the assembly.

Here, at least one of the first insulation substrate 110 and the second insulation substrate 210 is transparent. At least one of the first insulation substrate 110 and the second insulation substrate 210 may be made of a plastic material. Examples for the plastic material include polycarbon, polyimide, polyethersulfone (PES), polyarylate (PAR), polyethylene naphthalate (PEN), polyethylene terephthalate (PET), or the like. By making one or both of the insulation substrates 110 and 210 from a plastic substrate, a light and flexible EPD device can be obtained.

In the EPD device 1 according to the first embodiment, there is no color filter formed in the first substrate 100 or the second substrate 200. This is because the EPD device 1 of the invention expresses colors using the colors of the charged particles 270 in the sub-pixels.

The partition wall 250 is positioned between the first substrate 100 and the second substrate 200. The partition wall 250 partitions the individual sub-pixels 170a, 170b, 170c and 170d such that the charged particles 270 in each sub-pixel cannot move to other sub-pixels. The partition wall 250 may use Micorcup® (produced by SIPIX). The partition wall 250 is provided with an accommodator 251 to receive the fluid layer 260.

The fluid layer 260 in the accommodator 251 of the partition wall 250 preferably has a low viscosity to provide high mobility to the charged particles 270, and also preferably a low dielectric constant to suppress any chemical reaction. In addition, it is preferable that the fluid layer 260 be transparent to secure a reflected luminance. Examples of suitable materials for the fluid layer 260 include hydrocarbon such as decahydronaphthalene, 5-ethylidene-2-norbornene, fatty oil, or parafin oil; aromatic hydrocarbon such as toluene, xylene, do-decylbenzene, or alkylnaphthalene; and halogen solvent such as and halogen solvent such as perfluorodecalin, perfluorotoluene, perfluoroxylene, Dichlorobenzoic trifluoride, 3,4,5-trichlorobenzoic fluoride, chloropentafluoro-benzene, decholoronoein, pentachlorobenzene, among others.

The charged particles 270 dispersed in the fluid layer 260 determine the color of each of the sub-pixels 170a, 170b, 170c and 170d. The charged particle 270 includes a core 271 and a coloring layer 272 surrounding the core 271. The core 271 exhibits a white color and may be formed of titanium oxide ($TiO_2$) or silica ($SiO_2$). The coloring layer 271 exhibits one of red, blue and green colors. In the first embodiment, the charged particle 270 of the white sub-pixel 170a does not have a coloring layer 272. However, other embodiments may use a white coloring layer 272.

The charged particles 270 may have cores 271 that represent one of four different colors, in which case the sub-pixels are colored without using a coloring layer 272. In some embodiments, the core 271 contains carbon black. In this case, the charged particle 270 of the white sub-pixel 170d uses a coloring layer 272.

The charged particles 270 are configured to from one electrode to the other according to the electric field formed between the pixel electrode 151 and the common electrode 220, thereby controlling the quantity of reflected light. For example, in a case where all the charged particles 270 within the pixel 170 move toward the second substrate 200, the light reflected off the red, green, and blue sub-pixels 170a, 170b and 170c are combined to thereby exhibit a white color. The light reflected off the white sub-pixel 170d strengthens the white color. In contrast, when all the charged particles 270 move towards the first substrate 100, black color is exhibited due to a decrease in the quantity of reflected light.

The charged particle 270 may be used with its inherent charge, may be specifically charged using a charge control agent, or may be charged while floating in a solvent. The charge control agent may be a polymer or non-polymer material and an ionic or non-ionic material. Exemplary materials for the charge control agent include sodium dodecylbenzene sulphonate, metallic soap, polybutene succinimide, maleic anhydride copolymer, vinylpiridine copolymer, vinylpyrrolidone copolymer, acryl(methacryl) acid coploymer, or the like.

The charged particles 270 and the charge control agent dispersed in the fluid layer 260 provide colloidal stability, which can be achieved by controlling the size and the surface charge of the particles.

The drive voltage generator 700 generates a gate-on voltage $V_{on}$ to turn the thin film transistor T on, a gate-off voltage $V_{off}$ to turn the thin film transistor T off, and a common voltage $V_{com}$ to be applied to the common electrode 220.

The gradation voltage generator 800 generates multiple gray scale voltages related to the luminance of the EPD device 1.

The gate driver 400 is also known as a scan driver and connected to the gate line 121. The gate driver 400 applies gate signals to the gate line 121. A gate signal is a combination of the gate-on voltage $V_{on}$ and the gate-off voltage $V_{off}$ from the drive voltage generator 700.

The data driver 500 is also known as a source driver and receives a gradation voltage from the gradation voltage generator 800. The data driver 500 selects the gradation voltage according to a control signal from the signal controller 600 and applies the data voltage to the data line 141.

The signal controller 600 generates a control signal for controlling the operation of the gate driver 400, the data driver 500, the drive voltage generator 700, and the gradation voltage generator 800, etc. The signal controller 600 includes a signal converter 650, which receives an image signal of three colors R, G, B and processes it into an image signal of four colors R', G', B' and W.

Hereafter, the operation of the EPD device 1 will be explained in detail.

The signal controller 600 receives, from an external graphic controller, three color image signals R, G, and B and an input control signal for controlling the display of these image signals. For example, the signal controller 600 receives a vertical synchronizing signal $V_{sync}$, a horizontal synchronizing signal $H_{sync}$, a main clock MCLK, a data enable signal DE, as the input control signal. Based on the input control signal, the signal controller 600 generates a gate control signal CONT 1, a data control signal CONT 2, etc. The signal converter 650 of the signal controller 600 converts the three color image signals R, G and B appropriately into a four-color image signals R', G', B' and W so as to conform to the operational condition of the electrophoretic display panel 300, and then sends the gate control signal CONT 1 to the gate driver 400 and the drive voltage generator 700. The signal converter 650 also sends the data control signal CONT 2 and the processed image signals R', G', B' and W to the data driver 500.

The data control signal CONT 1 includes a vertical synchronization start signal STV for instructing the start of output of a gate-on pulse (a gate-on voltage range), a gate clock signal CPV for controlling the output timing of the gate-on pulse, a gate-on enable signal OE for limiting the width of the gate-on pulse, and the like.

The data control signal CONT 2 includes a horizontal synchronization start signal STH for instructing the start of input of image signals R', G', B' and W and a load signal LOAD or TP for allowing the relevant data voltage to be applied to the data line 141.

First, the gradation voltage generator 800 supplies to the data driver 500 a gradation voltage having a voltage value which is determined according to a voltage selection control signal.

According to the gate control signal, the gate driver 400 applies the gate-on voltage $V_{on}$ to the gate line 121 in sequence, thereby turning on the thin film transistor connected to the gate line 121.

Simultaneously, according to the data control signal CONT 2 from the signal controller 600, the data driver 500 receives the image signals R', G', B' and W corresponding to the sub-pixels 170*a*, 170*b*, 170*c* and 170*d* which are connected to the turned-on thin film transistor T. The signal controller 600 selects a gradation voltage corresponding to the respective image signals R', G', B' and W among the gradation voltages from the gradation voltage generator 800 to convert the image signals R', G', B' and W into the corresponding data voltages.

The data signal supplied to the data line 141 is applied through the turned-on thin film transistor T to the corresponding sub-pixels 170*a*, 170*b*, 170*c* and 170*s*. In this way, during one frame, the gate-on voltage $V_{on}$ is applied in sequence with respect to all the gate lines 121 such that the data signal is applied to all the sub-pixels 170*a*, 170*b*, 170*c* and 170*d*.

Hereafter, the data conversion in the signal converter 650 of the signal controller 600 will be explained in detail.

Figure 6:
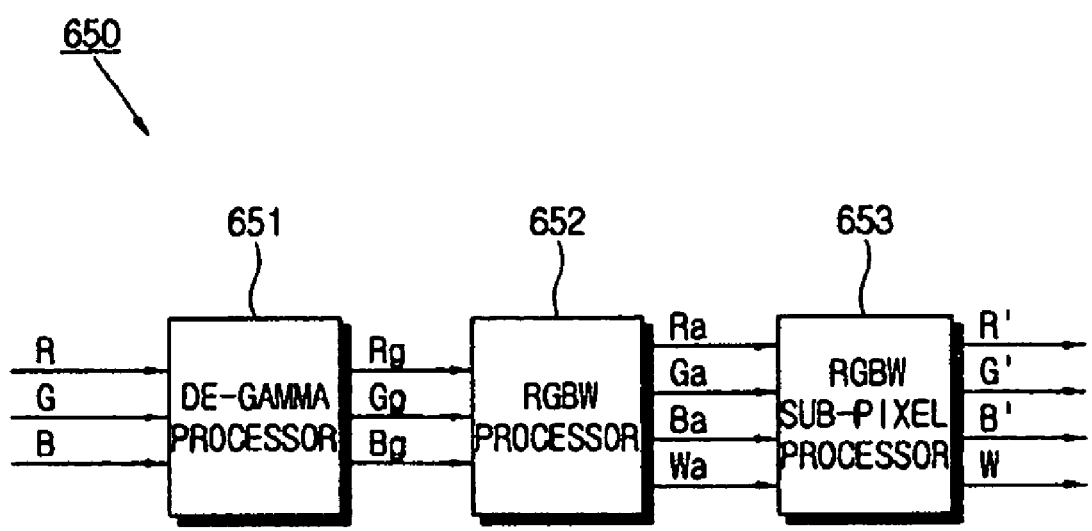
FIG. 6 is a block diagram of the signal converter in a signal controller of the electrophoretic display device according to the first embodiment of the invention.

FIG. 6 is a block diagram of the signal converter in a signal controller of the electrophoretic display device according to the first embodiment of the invention.

As illustrated in FIG. 6, the signal converter 650 includes a de-gamma processor 651, a RGBW processor 652 and a RGBW sub-pixel processor 653.

The de-gamma processor 651 removes a gamma correction signal (1/2.2 in case of NTSC) contained in the external three color image signals for each channel.

The RGBW processor 652 receives the three color channel image signals after the gamma correction signal is removed in the de-gamma processor 651, and adds a fourth color to the received three color channel image signals. The RGBW processor 652 sends four color image signals to the RGBW sub-pixel processor 653. At this time, the three colors of the RGB are slightly changed from their original colors.

The RGBW sub-pixel processor 653 calculates a brightness value for the RGBW four-channel signal for each sub-pixel and outputs the calculated brightness value to the data driver 500.

Figure 7:
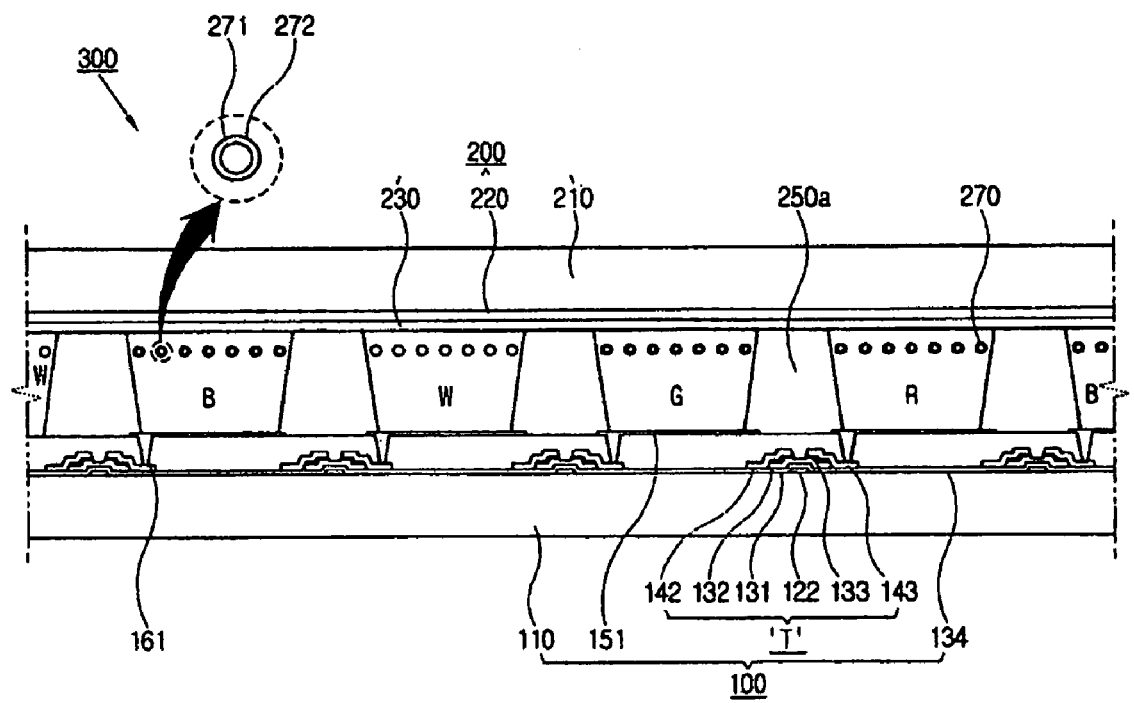
FIG. 7 is a sectional view showing an electrophoretic display panel according to a second embodiment of the invention.

Hereafter, a second embodiment of the invention will be described, referring to FIG. 7. FIG. 7 is a sectional view showing an electrophoretic display panel according to the second embodiment of the invention. The second embodiment will be explained with a focus on its differences from the first embodiment.

In the second embodiment, the partition wall is formed on the first substrate 100 instead of being separately prepared. The partition wall 250*a* may be fabricated through light exposure after formation of a photosensitive coat layer. Unlike in the first embodiment, the partition wall 250*a* does not separate the pixel electrode 251 from the fluid layer 260 in this second embodiment. Rather, the fluid layer 260 directly contacts the pixel electrode 251. Preferably, the fluid layer 260 is formed of a material that does not react with the pixel electrode 251.

Figure 8:
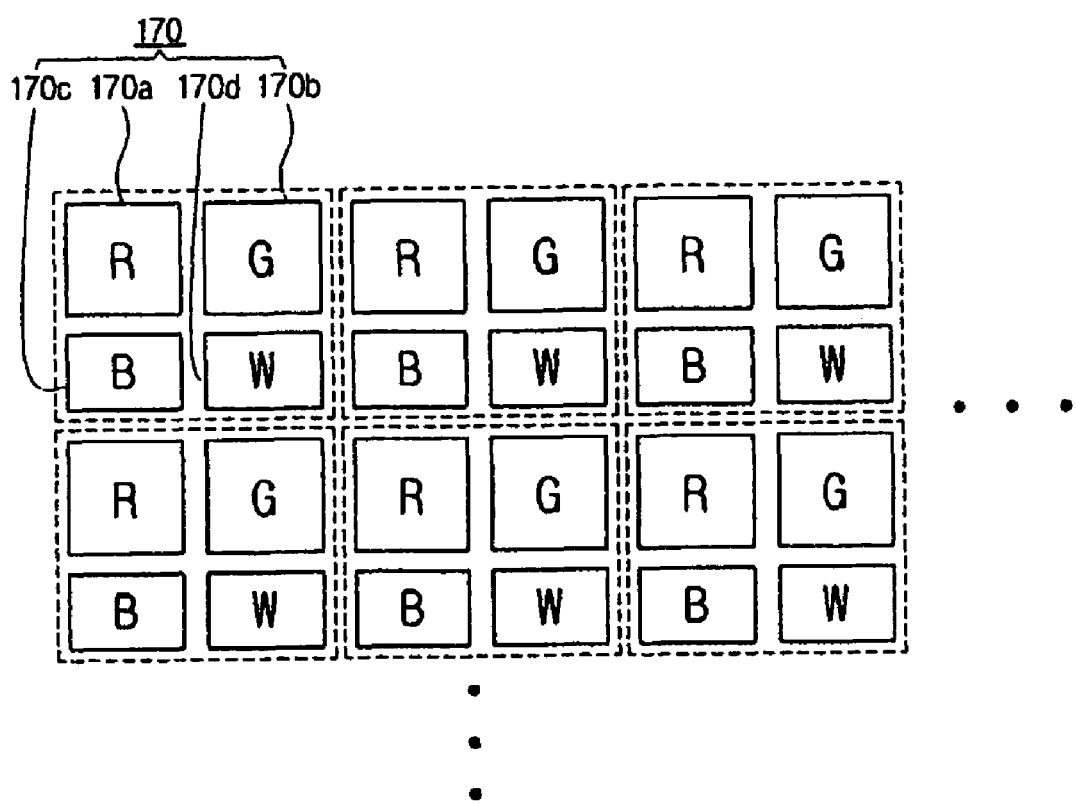
FIGS. 8 to 10 illustrate pixel arrangements of electrophoretic display panel according to third to fifth embodiments of the invention.
Figure 9:
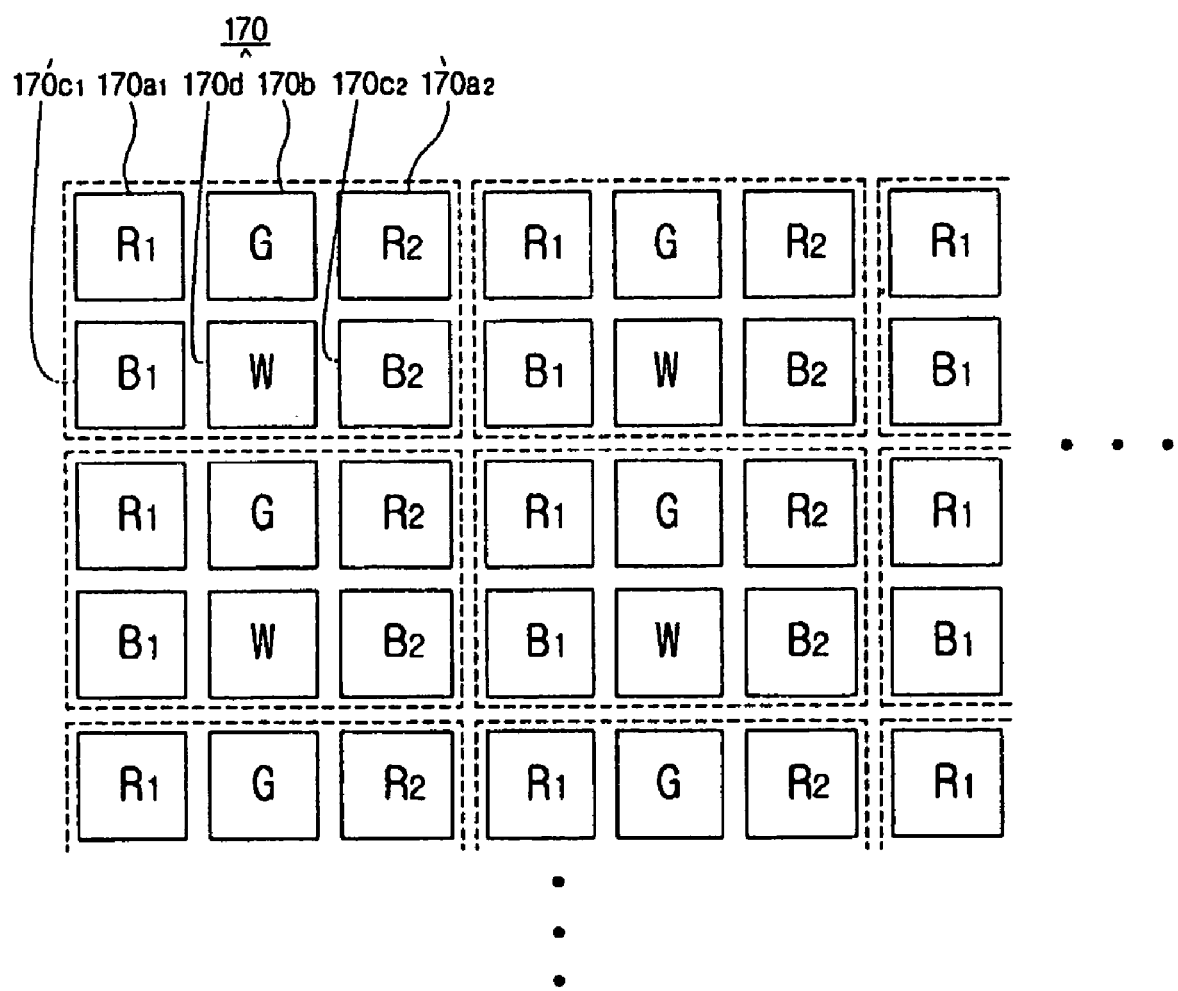
Figure 10:
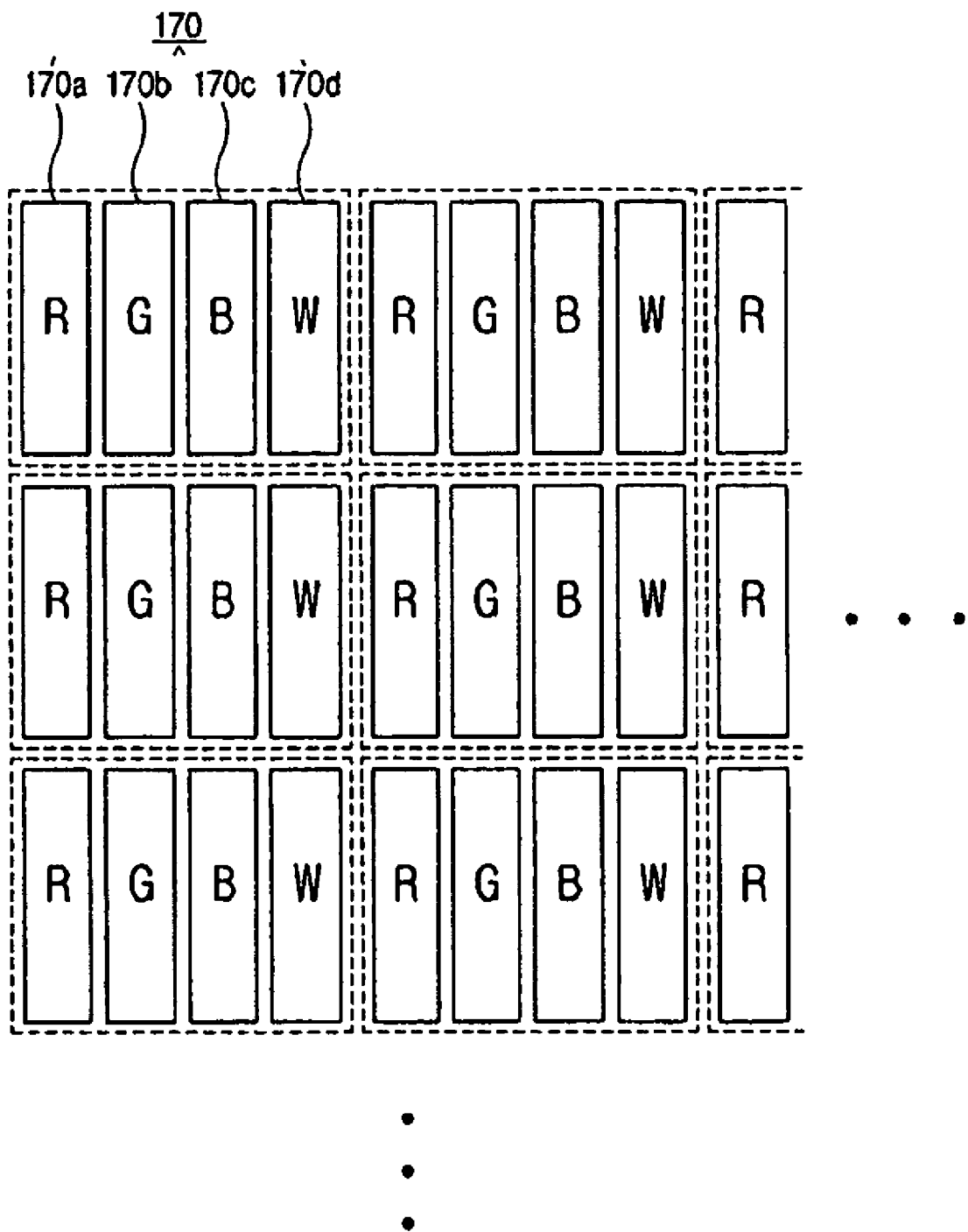

FIGS. 8 to 10 illustrate pixel arrangements of electrophoretic display panel according to third, fourth, and fifth embodiments of the invention, respectively.

FIG. 8 shows a pixel arrangement in the electrophoretic display panel according to the third embodiment. In this embodiment, four sub-pixels 170*a*, 170*b*, 170*c* and 170*d* that constitute one pixel 170 do not have the same area. For example, in the exemplary embodiment, the areas of the blue and white sup-pixels 170*c* and 170*d* are smaller than those of the red and green sub-pixels 170*a* and 170*b*. In other embodiments (not shown), the areas of the blue and white sup-pixels 170*c* and 170*d* may be larger than those of the red and green sub-pixels 170*a* and 170*b*.

FIG. 9 shows a pixel arrangement in the electrophoretic display panel according to the fourth embodiment. In this embodiment, six sub-pixels 170*a*1, 170*a*2, 170*b*, 170*c*1, 170*c*2 and 170*d* constitute one pixel 170. That is, one pixel 170 is constituted of two red sub-pixels 170*a*1 and 170*a*2, two blue sub-pixels 170*c*1 and 170*c*2, one green sub-pixel 170*b*, and one white sub-pixel 170*d*. In the embodiment shown, where the sub-pixels are arranged in a 3×2 matrix, the pixel 170 has a rectangular shape, not a square shape.

FIG. 10 shows a pixel arrangement in the electrophoretic display panel according to the fifth embodiment. Referring to FIG. 10, one pixel is constituted of four sub-pixels 170*a*, 170*b*, 170*c* and 170*d* which are linearly arranged.

The arrangement order of the sub-pixels within a single pixel is not limited to the above-described pixel arrangement. The sub-pixel arrangement may differ from one pixel to another pixel.

As described above, a pixel formed of a plurality of sub-pixels constitutes a single display unit. However, according to the present invention, a plurality of sub-pixels may be arranged in such a way as to be repeated in a regular pattern. In this case, the boundary of an object or a letter is controlled, based on a sub-pixel unit, not a pixel unit, and the sub-pixels within a pixel are not driven at the same time.

As described above, the present invention provides an electrophoretic display device having an improved reflective luminance.

In addition, the present invention provides a method of driving the electrophoretic display device having an improved reflective luminance.

Although a few embodiments of the present invention have been shown and described, it will be appreciated by those skilled in the art that changes or modifications may be made in these embodiments without departing from the principles and spirit of the invention, the scope of which is defined in the appended claims and their equivalents. Moreover, the use of the terms; first, second, etc. does not denote any order or importance, but rather the terms; first, second, etc. are used to distinguish one element from another. Furthermore, the use of the terms; a, an, etc. does not denote a limitation of quantity, but rather denote the presence of at least one of the referenced item.

What is claimed is:

1. An electrophoretic display device comprising:
   an electrophoretic display panel including sub-pixels corresponding to red, green, blue, and white colors;
   wherein each of the sub-pixels comprises charged particles having one of red, blue, green, and white colors.

2. The electrophoretic display device as set forth in claim 1, wherein the electrophoretic display panel comprises:
   a first substrate and a second substrate parallel to each other; and
   a partition wall disposed between the first substrate and the second substrate to partition the sub-pixels.

3. The electrophoretic display device as set forth in claim 2, wherein the partition wall contacts the second substrate.

4. The electrophoretic display device as set forth in claim 2, further comprising a fluid layer contained in a space defined by the partition wall, wherein the charged particles are dispersed within the fluid layer.

5. The electrophoretic display device as set forth in claim 4, wherein the fluid layer is a transparent organic solution.

6. The electrophoretic display device as set forth in claim 1, wherein the charged particles move between the first substrate and the second substrate according to an electric field formed between the first and the second substrates.

7. The electrophoretic display device as set forth in claim 1, wherein the charge particles comprise:
   a colored core; and
   a coloring layer around the core.

8. The electrophoretic display device as set forth in claim 7, wherein the color of the colored core is white.

9. The electrophoretic display device as set forth in claim 7, wherein the colored core is formed of titanium oxide or silica.

10. The electrophoretic display device as set forth in claim 1:
   wherein the first substrate comprises:
      a first insulation substrate;
      a thin film transistor formed on the first insulation substrate; and
      a pixel electrode connected to the thin film transistor; and
   wherein the second substrate comprises:
      a second insulation substrate; and
      a common electrode formed in the second insulation substrate.

11. The electrophoretic display device as set forth in claim 10, wherein at least one of the first insulation substrate and the second insulation substrate is formed of a plastic material.

12. The electrophoretic display device as set forth in claim 10, wherein the second insulation substrate directly contacts the common electrode.

13. The electrophoretic display device as set forth in claim 1, wherein a group of the sub-pixels having four different colors collectively constitute a pixel, and the sub-pixels of the group are arranged in a 2×2 matrix within the pixel.

14. The electrophoretic display device as set forth in claim 13, wherein the sub-pixels within the pixel have substantially the same size.

15. The electrophoretic display device as set forth in claim 1, wherein a group of the sub-pixels having four different colors collectively constitute a pixel, and the sub-pixels of the group are linearly arranged within the pixel.

16. The electrophoretic display device as set forth in claim 15, wherein the sub-pixels within the pixel have substantially the same size.

17. The electrophoretic display device as set forth in claim 1, wherein the sub-pixels having four different colors in which each color is one or more constitute a pixel.

18. An electrophoretic display device comprising:
   an electrophoretic display panel including sub-pixels having four different colors, wherein the sub-pixels each include charged particles of each corresponding color.

* * * * *